US010009266B2

(12) United States Patent
Wood et al.

(10) Patent No.: US 10,009,266 B2
(45) Date of Patent: *Jun. 26, 2018

(54) METHOD AND SYSTEM FOR REFERENCE COUNTED PENDING INTEREST TABLES IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/202,071

(22) Filed: Jul. 5, 2016

(65) Prior Publication Data
US 2018/0013666 A1 Jan. 11, 2018

(51) Int. Cl.
H04L 12/28 (2006.01)
H04L 12/741 (2013.01)
(Continued)

(52) U.S. Cl.
CPC ........ H04L 45/54 (2013.01); G06F 17/30312 (2013.01); H04L 45/308 (2013.01); H04L 45/72 (2013.01)

(58) Field of Classification Search
CPC .. H04L 45/54; H04L 45/308; G06F 17/30312
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

Primary Examiner — Gregory Sefcheck
Assistant Examiner — Jael Ulysse

(57) ABSTRACT

One embodiment provides a system for facilitating efficient communication of a collection of interests. During operation, the system receives, by an intermediate node, a first packet which has a name and a first nonce, wherein the first packet indicates a set of member interests, wherein a member interest has a name. In response to not obtaining a matching entry in a pending interest table based on the name for the first packet, the system creates a new entry in the pending interest table, wherein an entry includes a second nonce, a reference count, and a set of arrival nonces and corresponding arrival interfaces. The system sets the new entry's second nonce to a new nonce, and sets the new entry's reference count to a number of member interests indicated in the first packet. The system forwards the first packet, wherein the first nonce is replaced with the new nonce.

20 Claims, 10 Drawing Sheets

(51) Int. Cl.
*G06F 17/30* (2006.01)
*H04L 12/721* (2013.01)
*H04L 12/725* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |

(56) References Cited

U.S. PATENT DOCUMENTS

| | | |
|---|---|---|
| 9,112,895 B1 | 8/2015 | Lin |
| 9,253,087 B2 | 2/2016 | Zhang |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |

(56) References Cited

U.S. PATENT DOCUMENTS

| | | |
|---|---|---|
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1* | 11/2009 | Jacobson ............ G06F 15/173 726/22 |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1* | 8/2010 | Jacobson ............ H04L 45/00 370/392 |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0084364 A1* | 4/2012 | Sivavakeesar ...... H04L 12/1818 709/205 |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |

(56) References Cited

U.S. PATENT DOCUMENTS

| | | |
|---|---|---|
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1* | 8/2013 | Qian ............ H04L 67/327 709/241 |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1* | 10/2013 | Zhang ............ H04L 45/306 709/217 |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1* | 6/2014 | Kim ............ H04L 67/06 707/769 |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1* | 8/2014 | Xie ............ H04L 45/44 370/400 |
| 2014/0237085 A1* | 8/2014 | Park ............ G06Q 50/10 709/219 |
| 2014/0245359 A1 | 8/2014 | DeFoy |
| 2014/0254595 A1 | 9/2014 | Luo |
| 2014/0280823 A1* | 9/2014 | Varvello ............ H04L 67/327 709/223 |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis ............ H04L 67/327 709/204 |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117449 A1* | 4/2015 | Mosko ............ H04L 45/7453 370/392 |
| 2015/0117452 A1* | 4/2015 | Mosko ............ H04L 47/365 370/392 |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0254347 A1* | 9/2015 | Mosko ............ G06F 17/30864 370/392 |
| 2015/0279348 A1 | 10/2015 | Cao |
| 2015/0280918 A1* | 10/2015 | Uzun ............ H04L 9/3236 713/176 |
| 2015/0349961 A1 | 12/2015 | Mosko |
| 2015/0350078 A1* | 12/2015 | Azgin ............ H04L 45/306 370/392 |
| 2015/0372903 A1 | 12/2015 | Hui |
| 2015/0381546 A1 | 12/2015 | Mahadevan |
| 2016/0021172 A1 | 1/2016 | Mahadevan |
| 2017/0078199 A1* | 3/2017 | Mosko ............ H04L 45/7453 |
| 2017/0126643 A1* | 5/2017 | Wood ............ H04L 9/0861 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

(56) References Cited

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: A content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

"PBC Library-Pairing-Based Cryptography-About," http://crypto.stanford.edu/pbc. downloaded Apr. 27, 2015.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heal pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

Anteniese et al., "Improved Proxy Re-Encryption Schemes with Applications to Secure Distributed Storage", 2006.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Xiong et al., "CloudSeal: End-to-End Content Protection in Cloud-based Storage and Delivery Services", 2012.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Science vol. 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

Gopal et al. "Integrating content-based Mechanisms with hierarchical File systems", Feb. 1999, University of Arizona, 15 pages.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

(56) References Cited

OTHER PUBLICATIONS

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/ www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

(56) References Cited

OTHER PUBLICATIONS

Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003] - [006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.

* cited by examiner

INTEREST
GROUP 150
(Time = T1)

BASENAME 152 = /basename
ARRIVAL NONCE 153 = 20
MEMBER INTEREST NAME 154.1 = /a/b
MEMBER INTEREST NAME 154.2 = /c/d
MEMBER INTEREST NAME 154.3 = /e/f
MEMBER INTEREST NAME 154.4 = /g/h
MEMBER INTEREST NAME 154.5 = /j/k

FIG. 1B

PIT 130
(TIME = T2)

| | NAME 132 | NONCE 134 | { MEMBER INT NAMES 142 } | { ARR NONCE 144, ARR INTERF 146 } | REFERENCE COUNT 148 |
|---|---|---|---|---|---|
| PIT ENTRY 131.1 | /basename | 25 | /a/b, /c/d, /e/f, /g/h, /j/k | { AN=20, AI=1 } | 5 |
| PIT ENTRY 131.2 | /single/int | { null } | { null } | { null, AI=3, 4, 8 } | { null } |
| | .... | .... | | .... | |

FIG. 1C

INTEREST
GROUP 150
(Time = T3)

BASENAME 152 = /basename
ARRIVAL NONCE 153 = 25
MEMBER INTEREST NAME 154.1 = /a/b
MEMBER INTEREST NAME 154.2 = /c/d
MEMBER INTEREST NAME 154.3 = /e/f
MEMBER INTEREST NAME 154.4 = /g/h
MEMBER INTEREST NAME 154.5 = /j/k

FIG. 1D

METHOD AND SYSTEM FOR REFERENCE COUNTED PENDING INTEREST TABLES IN A CONTENT CENTRIC NETWORK

RELATED APPLICATION

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");
- U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515"); and
- U.S. patent application Ser. No. 15/194,135, entitled "METHOD AND SYSTEM FOR INTEREST GROUPS IN A CONTENT CENTRIC NETWORK," by inventors Christopher A. Wood and Glenn C. Scott, filed 27 Jun. 2016 (hereinafter "U.S. patent application Ser. No. 15/194,135");

the disclosures of which are herein incorporated by reference in their entirety.

BACKGROUND

Field

This disclosure is generally related to distribution of digital content. More specifically, this disclosure is related to a method and system for efficient communication of a collection of distinct interests.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending an interest packet for content and receiving a content object packet (or a manifest) in return. A CCN interest and a content object (or a manifest) are identified by their unique names, which are typically hierarchically structured variable length identifiers (HSVLI). An HSVLI can include contiguous name components ordered from a most general level to a most specific level.

As an interest packet is routed through the network from a content requesting node to a content producing node, each intermediate CCN router adds an entry in its pending interest table (PIT) corresponding to the interest and forwards the interest to the next CCN router. When a matching content object packet is sent from the content producing node back to the requesting node, it follows the reverse path of the interest. Each intermediate CCN router forwards the content object along the requesting or arrival interfaces listed in the corresponding PIT entry, and subsequently removes the PIT entry, indicating that the interest has been fulfilled.

An interest group is a CCN message which represents a collection of distinct interests. Just as an interest includes a name (which is indicated in a corresponding PIT entry), an interest group includes a name. An interest group can also be forwarded just like an interest, i.e., based on its name and information in a forwarder's FIB. Upon receiving an interest group, a forwarder can create PIT entries where the indicated information of an interest group is stored in a single PIT entry. Additionally, a forwarder can create additional PIT entries if a list of n member interests creates n distinct PIT entries, such as in decomposition of interest groups, as described in U.S. patent application Ser. No. 15/194,135.

However, creating additional PIT entries based on the n member interests of an interest group can lead to variable and inconsistent expansion of the PIT, which may result in an inefficient system and decrease the effectiveness of data distribution in the network.

SUMMARY

One embodiment provides a system for facilitating efficient communication of an interest group packet indicating a collection of interests. During operation, the system receives, by an intermediate node, a first packet which has a name and a first nonce, wherein the first packet indicates a set of member interests, wherein a member interest has a name, wherein a name is a hierarchically structured variable length identifier that includes contiguous name components ordered from a most general level to a most specific level. In response to not obtaining a matching entry in a pending interest table based on the name for the first packet, the system creates a new entry in the pending interest table, wherein an entry includes a second nonce, a reference count, and a set of arrival nonces and corresponding arrival interfaces. The system sets the new entry's second nonce to a new nonce, and sets the new entry's reference count to a number of member interests indicated in the first packet. The system forwards the first packet, wherein the first nonce is replaced with the new nonce, thereby facilitating efficient communication of the set of member interests indicated in the first packet.

In some embodiments, in response to determining that the reference count of an entry in the pending interest table is zero, the system removes the entry from the pending interest table.

In some embodiments, the system sets the new entry's arrival nonce to the first nonce of the first packet and sets the new entry's corresponding arrival interface to an interface corresponding to an entity from which the first packet is received.

In some embodiments, in response to obtaining a matching entry in the pending interest table, the system performs the following operations: adds to the matching entry's set of arrival nonces and corresponding arrival interfaces the first nonce of the first packet and an arrival interface corresponding to an entity from which the first packet is received; replaces the first nonce of the first packet with the matching entry's second nonce; and forwards the first packet.

In some embodiments, in response to obtaining a content object packet which has a name and a verification nonce, and in response to obtaining a matching entry in the pending interest table based on the verification nonce, the system performs the following operations: decrements the matching entry's reference count by one; replaces the verification nonce of the content object packet with the matching entry's arrival nonce; and transmits the content object packet based on the matching entry's corresponding arrival interface.

In some embodiments, the system receives a second packet which has a name and an arrival nonce. In response to obtaining a matching entry in the pending interest table based on the name or the arrival nonce of the second packet, the system increments the matching entry's reference count by one.

In some embodiments, in response to obtaining a content object that satisfies a member interest, and in response to not obtaining a matching entry in the pending interest table, the system performs the following operations: creates the new entry in the pending interest table; decrements the new entry's reference count by one; sets a verification nonce of the obtained content object to the first nonce indicated in the first packet; and transmits the obtained content object based on the new entry's corresponding arrival interface.

BRIEF DESCRIPTION OF THE FIGURES

FIG. 1B illustrates an exemplary interest group packet, in accordance with an embodiment of the present invention.

FIG. 1C illustrates an exemplary pending interest table, in accordance with an embodiment of the present invention.

FIG. 1D illustrates an exemplary interest group packet, in accordance with an embodiment of the present invention.

In the figures, like reference numerals refer to the same figure elements.

DETAILED DESCRIPTION

Figure 1A:
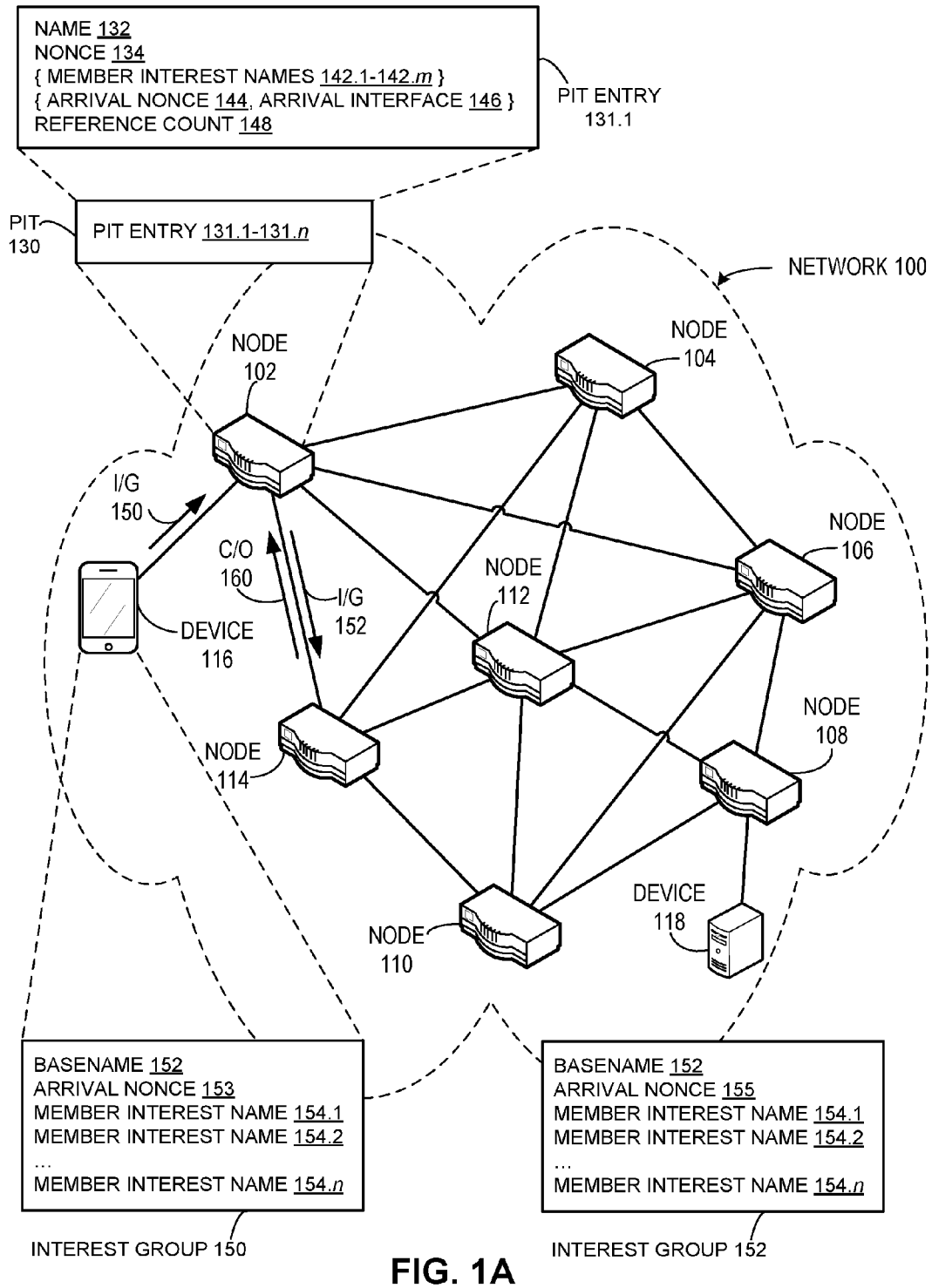
FIG. 1A illustrates an exemplary network that facilitates efficient communication of a collection of interests based on reference counted pending interest tables, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates reference counted pending interest tables (PIT). Such PITs may be used to reduce the size of individual member entries consumed by an "interest group." An interest group is a CCN message which represents a collection of distinct interests. An interest group is based on a recent construction, known as an "interest list." Interest groups are described in U.S. patent application Ser. No. 15/194,135, and interest lists are described in Kurihara, et al., "List Interest: Packing Interests for Reduction of Router Workload in CCN 1.0."

In CCN, each entity maintains a PIT which stores entries with information about previously received and forwarded interests. A standard PIT entry can include a name, a KeyIdRestriction, a ContentObjectHashRestriction, a set of arrival or incoming interfaces and corresponding times, and other information (e.g., a timeout). Just as an interest includes a name (which is indicated in a corresponding PIT entry), an interest group includes a name. An interest group can also be forwarded just like an interest, i.e., based on its name and information in a forwarder's FIB. Upon receiving an interest group, a forwarder can create PIT entries where the indicated information of an interest group is stored in a single PIT entry. Additionally, a forwarder can create additional PIT entries if a list of n member interests creates n distinct PIT entries, such as in decomposition of interest groups, as described in U.S. patent application Ser. No. 15/194,135. However, creating additional PIT entries based on the n member interests of an interest group can lead to variable and inconsistent expansion of the PIT, which may result in system efficiencies.

Embodiments of the present invention solve this problem by providing a system based on reference counted PITs which enables the expansion of the PIT to remain constant for any size interest list or interest group. The system extends the traditional PIT entry to include the following information: a) a randomly generated nonce that is unique to each entry; b) a total reference count, which is initialized to the size (in indicated member interests) of the interest list or interest group; and c) the set of arrival nonces obtained from a received interest list or group. Furthermore, an interest group includes an "arrival nonce," which is a nonce randomly generated by a sending node that allows an upstream router to provide verification that a matching content object is in response to an interest indicated in the (previously transmitted) interest group.

Upon receiving an interest group that includes an arrival nonce, a receiving entity (such as an intermediate router or other forwarder) can first look in its content store (CS), then look in its PIT. If a matching PIT entry is not found, the intermediate router can create a "reference counted" PIT entry (which includes a new nonce, the total reference count, and the arrival nonce from the interest group). The intermediate router can replace, in the per-hop header of the interest group, the arrival nonce of the interest group with the new nonce from the matching PIT entry. Before overwriting the arrival nonce of the interest group, the intermediate router can add the existing value of the arrival nonce to the newly created (or existing) PIT entry. The reference count is not incremented when an interest or interest group is aggregated, as this additional information is taken into account by the growth of the arrival set, as described below in relation to FIGS. 2A-2C. Processing an interest group based on reference counted PITs is described below in relation to FIGS. 3A-3C.

Subsequently, the intermediate router can receive, from an upstream node, a content object that is responsive to a member interest indicated in an interest group. The intermediate router can obtain the matching PIT entry and decrement the reference count of the matching PIT entry by one. The upstream node that sends the responsive content object can include a verification nonce in the content object, where the verification nonce is the same as the nonce in the previous-hop's PIT entry (and is included in the per-hop header of the interest group as the arrival nonce). Processing a content object based on reference counted PITs is described below in relation to FIG. 4A.

A responsive content object transmitted by the upstream node may be dropped or not reach the intermediate router or other downstream node. In this case, the downstream node can re-transmit or re-express an individual interest which includes a name and an arrival nonce which is the same as the arrival nonce of the interest group which indicates the corresponding member interest. The intermediate router can receive the re-expressed interest, obtain a matching PIT entry (based on the arrival nonce and/or the name), and increment the PIT entry reference count by one. Processing a re-transmitted or re-expressed interest is described below in relation to FIG. 4B.

Thus, the present system provides improvements to the distribution of digital content, where the improvements are fundamentally technological. Embodiments of the present invention provide a technological solution (e.g., using reference counted pending interest tables to effectively communicate an interest group, which includes a collection of distinct requests for digital content) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1A illustrates an exemplary network that facilitates efficient communication of a collection of interests based on reference counted pending interest tables, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102 and 114) or a core router (e.g., intermediate CCN routers 104-112). Each CCN router can maintain a pending interest table (PIT) (e.g., PIT 130 of node 102), a local cache or content store (CS) (not shown), and a forwarding information base (FIB) (not shown). PIT 130 can include PIT entries 131.1-131.$n$ associated with pending interests. A PIT entry (e.g., PIT entry 131.1) can include a name 132, a nonce 134, a list of member interest names 142, a set of arrival nonces 144 and corresponding arrival interfaces 146, and a reference count 148. PIT 130 can also include other fields (not shown), such as a KeyIdRestriction, a ContentObjectHashRestriction, an arrival time, and a time out.

During operation, device 116 can send an interest group 150, where interest group 150 indicates a collection of interests for data. Interest group 150 is a packet that can include a basename 152, an arrival nonce 153, and member interest names 154.1-154.n corresponding to each member interest. Basename 152 is not required to (but can) be related to member interest names 154.1-154.p. In other words, member interest names 154.1-154.p can be independent of and distinct from basename 152. Arrival nonce 153 can be used by a subsequent upstream router to provide verification that a responsive content object is in response to a member interest of the (previously transmitted) interest group, rather than an individual interest with a same name as the interest. An exemplary interest group packet is described below in relation to FIG. 1B.

Interest group 150 can travel through network 100. Node 102 can receive interest group 150 and perform a lookup in its CS for a matching content object based on a member interest name (e.g., member interest name 154.1). If no matching content object is found in the CS, node 102 can perform a lookup in PIT 130 for a matching PIT entry corresponding to interest group 150, based on basename 152. If no matching PIT entry is found, node 102 can create a new PIT entry for interest group 150. An exemplary PIT is described below in relation to FIG. 1C. For example, the newly created PIT entry can include name 132 with a value of basename 152, nonce 134 with a value that is a new nonce (randomly generated by node 102), member interest names 142.1-142.m corresponding to member interest names 154.1-154.p, the set of arrival nonces 144 and corresponding arrival interfaces 146, and reference count 148 set to the value of m (e.g., the number of member interests indicated in interest group 150). For a single, standard PIT entry (e.g., not an interest group), reference count 148 can be set to a value of 1. Node 102 can add arrival nonce 153 of interest group 150 and the corresponding arrival interface to the new PIT entry as a tuple in the set of arrival nonces 144 and arrival interfaces 146. Node 102 can also replace arrival nonce 153 in interest group 150 with the new nonce 134, resulting in interest group 152 with arrival nonce 155. Node 102 can transmit interest group 152 to a next-hop node based on information in its FIB. Note that interest group 152 is shown as a packet separate and distinct from 150 for illustration purposes only. However, node 102 actually replaces arrival nonce 153 with the value of nonce 134 for arrival nonce 155. An exemplary interest group packet with a replaced arrival nonce is described below in relation to FIG. 1D.

If a matching PIT entry is found, node 102 can add the arrival nonce of the interest group packet and the arrival interface corresponding to the entity from which interest group 150 is received (e.g., device 116) to the matching PIT entry (e.g., as a new tuple in the set of arrival nonces 144 and arrival interfaces 146). Node 102 can replace arrival nonce 153 of interest group 150 with the new nonce 134, resulting in interest group 152 with arrival nonce 155. Processing an interest group packet is described below in relation to FIGS. 3A-3C.

Subsequently, node 102 can receive a content object 160 which has a name and a verification nonce. If a matching PIT entry is found based on the verification nonce, node 102 can decrement the matching PIT entry's reference count by one.

Node 102 can also replace the verification nonce of the content object with the corresponding PIT entry's arrival nonce, and can further transmit the received content object via the corresponding arrival interface. If a matching PIT entry is not found, node 102 can store the received content object in its CS or discard the received content object. Exemplary content object packets are described below in relation to FIGS. 1E and 1G, and an exemplary PIT corresponding to these exemplary content object packets is described below in relation to FIG. 1F. Furthermore, processing a matching content object packet is described below in relation to FIG. 4.

If the reference count of a PIT entry reaches zero, the relevant intermediate node can remove that PIT entry from its PIT. A PIT entry is only removed by the intermediate node when its reference count is equal to zero. Recall that a re-transmitted interest can include its own arrival nonce. If the arrival nonce and arrival interface of a received interest (regardless of re-transmission) matches an arrival nonce and interface for a previously received interest group indicating a member interest corresponding to the received interest, the intermediate node can increment the reference count. However, if the arrival nonce does not match, or if an individual interest or an interest group is transmitted with a different arrival nonce or via a different arrival interface, the intermediate node simply aggregates the interest or interest group, and does not increment the reference count. The additional information is taken into account by the growth of the arrival interface set. Processing a re-transmitted interest is described below in relation to FIGS. 2A-2C.

Thus, in this manner, embodiments of the present invention provide an efficient communication of a collection of distinct interests based on reference counted pending interest tables.

Exemplary Interest Groups and Corresponding PIT

FIG. 1B illustrates an exemplary interest group packet 150, in accordance with an embodiment of the present invention. Interest group packet 150 (or interest group 150) at a time of T1 can include a basename 152 with a value of "/basename," an arrival nonce 153 with a value of "20," and member interest names 154.1-154.5. For example, member interest name 154.1 is "/a/b," member interest name 154.2 is "/c/d," member interest name 154.3 is "/e/f," member interest name 154.4 is "/g/h," and member interest name 154.4 is "/j/k."

FIG. 1C illustrates an exemplary pending interest table 130, in accordance with an embodiment of the present invention. PIT 130 reflects a PIT entry added at a time of T2, upon receiving interest group 150 at a time of T1 (and determining that no matching content object exists in the CS). An entry in PIT 130 includes the following: a name 132 (e.g., basename 152); a nonce 134 (which is randomly generated by a receiving entity); a list of member interest names 142 (e.g., member interest names 154.1-154.5); a set of tuples comprised of an arrival nonce 144 and a corresponding arrival interface 146 (e.g., arrival nonce 153 and a corresponding interface or face on which interest group 150 is received); and a reference count 148 (i.e., the size of interest group 150 in number of member interests). Arrival nonce 144 can correspond to arrival nonce 153 of interest group 150, and corresponding arrival interface 146 can correspond to the interface or face on which interest group 150 is received.

Thus, PIT entry 131.1 can include the following: a name 132 of "/basename"; a nonce 134 with a value of "20"; a list of member interest names, "/a/b," "/c/d," "/e/f," "/g/h," and "/j/k"; a tuple comprising an arrival nonce ("AN") with a value of "20" and an arrival interface ("AI") with a value of "1"; and a reference count 148 with a value of "5." PIT 130 can also include an entry for a standard or single interest. For example, PIT entry 131.2 can include a name of "/single/int" and a set of arrival or incoming interfaces. Note that in standard PIT entry 131.2, the nonce, the member interest names, the arrival nonce, and the reference count can all contain null values.

FIG. 1D illustrates an exemplary interest group packet 150, in accordance with an embodiment of the present invention. Interest group packet 150 (or interest group 150) illustrates an interest group packet that is modified by a receiving entity (e.g., an intermediate router or other forwarder) before the receiving entity forwards the interest group on to the network. Interest group 150 at a time of T3 includes similar fields and values as interest group 150 at time T1 as shown in FIG. 1B. However, arrival nonce 153 of interest group 150 at time T3 includes arrival nonce 153 with a value of "25" rather than a value of "20," which reflects that the intermediate router has generated a new random nonce (i.e., nonce 134) and included the new nonce as the arrival nonce for interest group 150. In other words, the intermediate router can replace the arrival nonce in the per-hop header of the interest group with the new nonce generated for the PIT entry.

Note that PIT 130 in FIG. 1C at time T2 reflects the creation of a new PIT entry 131.1 at a receiving node or intermediate router. If PIT entry 131.1 already exists at time T1, the intermediate router can add a new tuple to the set of arrival nonces and arrival interfaces. Aggregation of "similar" interests (e.g., with the same name or other field) does not cause the reference count to increase. Only a responsive content object with a verification nonce that is the same as the nonce in the PIT entry can satisfy a member interest indicated in the PIT entry and cause the reference count to decrement by one. Similarly, only a re-transmitted interest with an arrival nonce that is the same as an arrival nonce in the PIT entry can cause the reference count to increment by one. In other words, the reference count is not affected during aggregation of an interest (e.g., adding an arrival nonce or an arrival nonce/interface tuple).

Furthermore, note that a name for a member interest which is satisfied by a responsive content object is not removed from either the interest group or the PIT. Embodiments of the system of the present invention do not track which member interests are satisfied; rather, the system tracks the number of member interests satisfied based on reference counting in the PIT.

Exemplary Content Object and Corresponding PIT

Figure 1E:
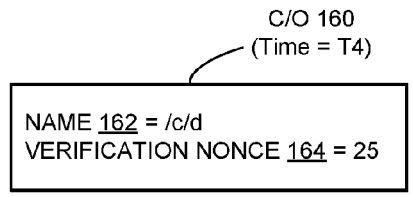
FIG. 1E illustrates an exemplary content object packet, in accordance with an embodiment of the present invention.

FIG. 1E illustrates an exemplary content object packet 160, in accordance with an embodiment of the present invention. Content object 160 at a time of T4 can include a name 162 of "/c/d" and a verification nonce 164 with a value of "25." Content object 160 can be a responsive content object for a member interest indicated in interest group 150 (i.e., corresponding to the name "/c/d"). Verification nonce 164 can be used by a receiving entity to confirm that the received content object is in response to an interest (or member interest of an interest group) in a PIT of the receiving entity.

Figure 1F:
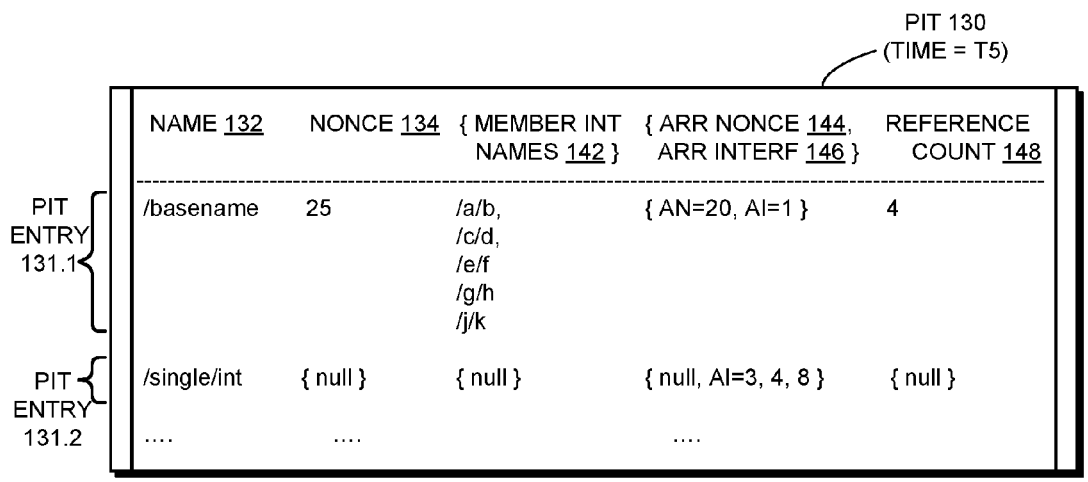
FIG. 1F illustrates an exemplary pending interest table, in accordance with an embodiment of the present invention.

FIG. 1F illustrates an exemplary pending interest table 130, in accordance with an embodiment of the present invention. PIT 130 reflects PIT entry 131.1 after a receiving entity has received responsive content object 160 and decremented the reference count for the entry. For example, node 102 can receive content object 160 and determine, based on the name and the verification nonce, that the received content object 160 is both in response to and satisfies an interest or member interest indicated in PIT 130 of node 102. Node 102 can replace the verification nonce in the per-hop header of the content object packet with the arrival nonce for the corresponding arrival interface of the corresponding PIT entry, as described below in relation to FIG. 1G. Decrementing the reference count is described below in relation to FIGS. 3C and 4.

Figure 1G:
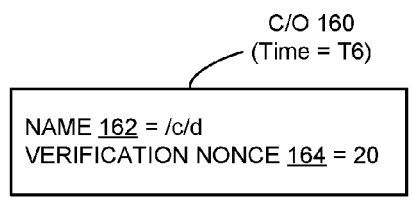
FIG. 1G illustrates an exemplary content object packet, in accordance with an embodiment of the present invention.

FIG. 1G illustrates an exemplary content object packet 160, in accordance with an embodiment of the present invention. Content object 160 at a time of T6 includes a name 162 of "/c/d" and a verification nonce 164 with a value of "20." For example, as described above, node 102 can determine to transmit a responsive content object (e.g., content object 160) to a previous-hop node based on the arrival interface of the set of tuples. Node 102 can replace the verification nonce in the responsive content object with the corresponding arrival nonce for the arrival interface of the determined previous-hop node.

Exemplary Re-Transmitted Interest and Corresponding PIT

Figure 2A:
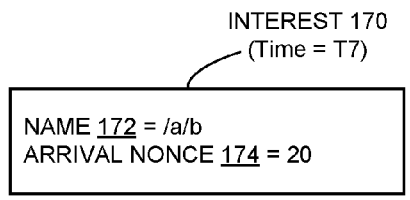
FIG. 2A illustrates an exemplary interest packet, in accordance with an embodiment of the present invention.

FIG. 2A illustrates an exemplary interest packet 170, in accordance with an embodiment of the present invention. Interest 170 at a time of T7 can include a name of "/a/b" and an arrival nonce with a value of "20." Interest 170 can be an interest re-transmitted by a client computing device or a downstream router. Interest 170 can be a re-transmitted or re-expressed interest for a member interest indicated in interest group 150. Arrival nonce 174 can include a value that matches the arrival nonce included in interest group 150.

Figure 2B:
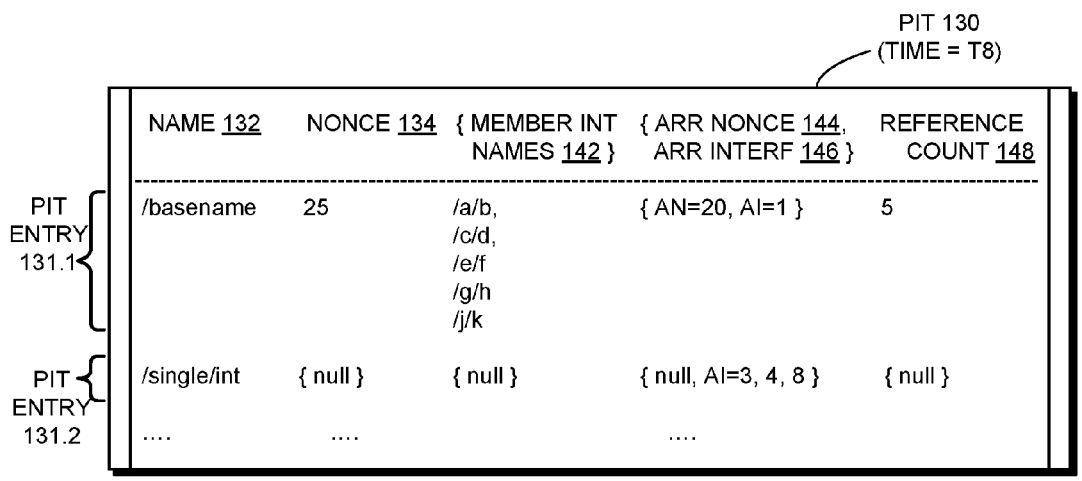
FIG. 2B illustrates an exemplary pending interest table, in accordance with an embodiment of the present invention.

FIG. 2B illustrates an exemplary pending interest table 130, in accordance with an embodiment of the present invention. PIT 130 reflects PIT entry 131.1 after a receiving entity has received re-transmitted interest 170. For example, node 102 can receive interest 170, perform a lookup for arrival nonce 174 with a value of "20" in PIT 130, obtain matching PIT entry 131.1, and increment reference count 148 by one (i.e., from "4" to "5"). As described above, PIT aggregation occurs when an interest or interest group is received that is "similar" to an interest or interest group with an existing PIT entry, such as when a new tuple of {arrival nonce, arrival interface} is added to an existing PIT entry. When aggregation occurs, the reference count is not incremented.

Figure 2C:
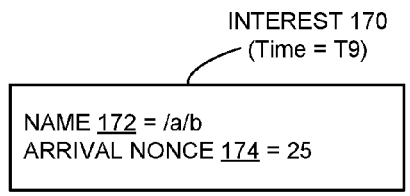
FIG. 2C illustrates an exemplary interest packet, in accordance with an embodiment of the present invention.

FIG. 2C illustrates an exemplary interest packet 170, in accordance with an embodiment of the present invention. Interest 170 at a time of T9 includes a name 172 of "/a/b" and an arrival nonce 174 with a value of "25." For example, as described above, node 102 can determine to increment the reference count for PIT entry 131.1, replace arrival nonce 174 of interest 170 with nonce 134 of PIT entry 131.1, and transmit interest 170 to a next-hop node based on information in its FIB.

Intermediate Node Facilitates Reference Counted PITs

Figure 3A:
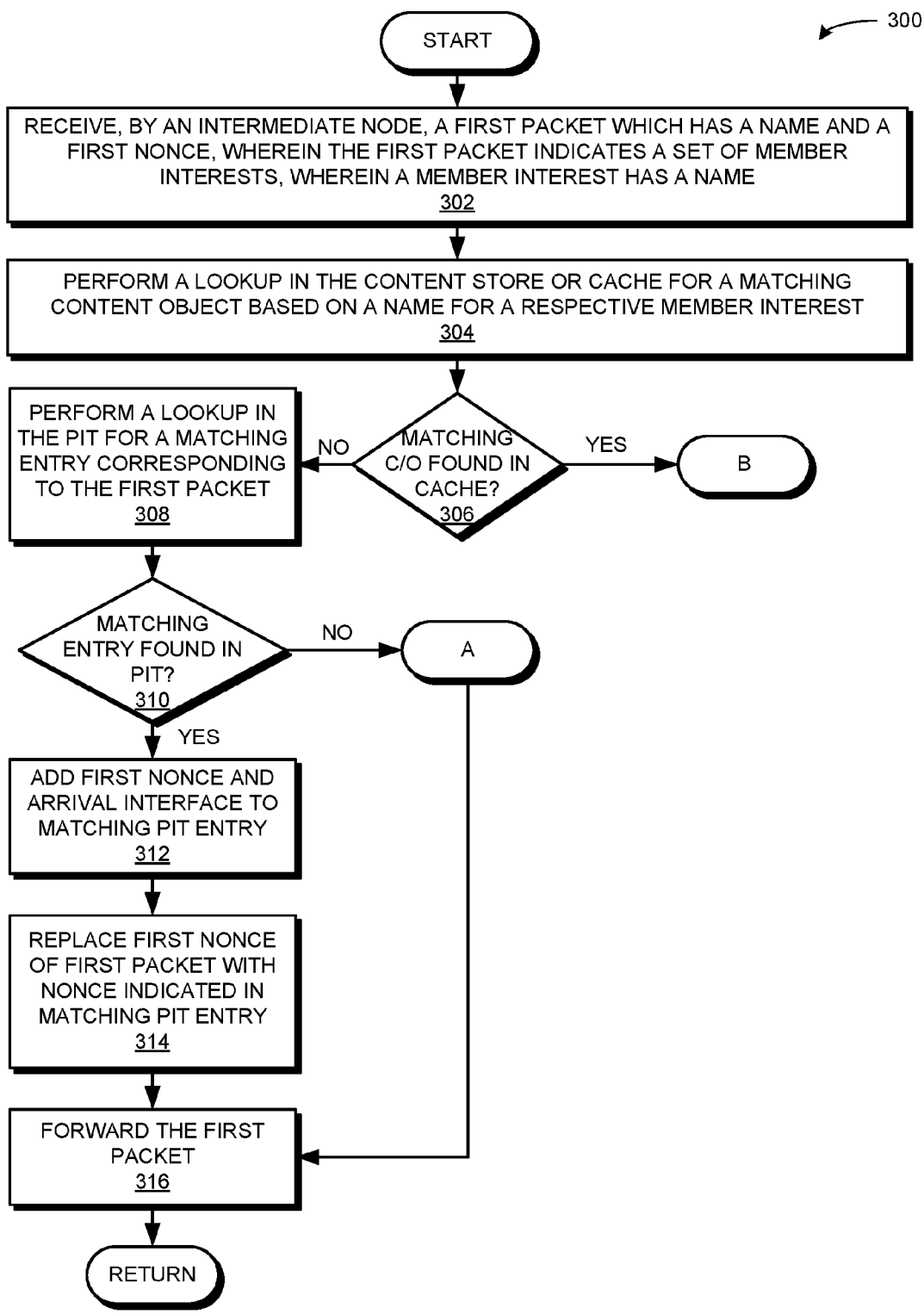
FIG. 3A presents a flow chart illustrating a method by an intermediate node for facilitating efficient communication of a collection of interests based on reference counted pending interest tables, in accordance with an embodiment of the present invention.

FIG. 3A presents a flow chart 300 illustrating a method by an intermediate node for facilitating efficient communication of a collection of interests based on reference counted pending interest tables, in accordance with an embodiment of the present invention. During operation, the system receives, by an intermediate node, a first packet which has a name and a first nonce, wherein the first packet indicates a set of member interests, wherein a member interest has a name (operation 302). A name can be a hierarchically structured variable length identifier that includes contiguous name components ordered from a most general level to a most specific level. The system performs a lookup in a local cache or content store (CS) for a matching content object based on a name for a respective member interest (operation 304). If a matching content object is found in the cache (decision 306), the operation continues as described at Label B of FIG. 3C. If a matching content object is not found in the cache (decision 306), the system performs a lookup in the PIT for a matching entry corresponding to the first packet (operation 308). The lookup can be based on the name for the first packet.

Figure 3B:
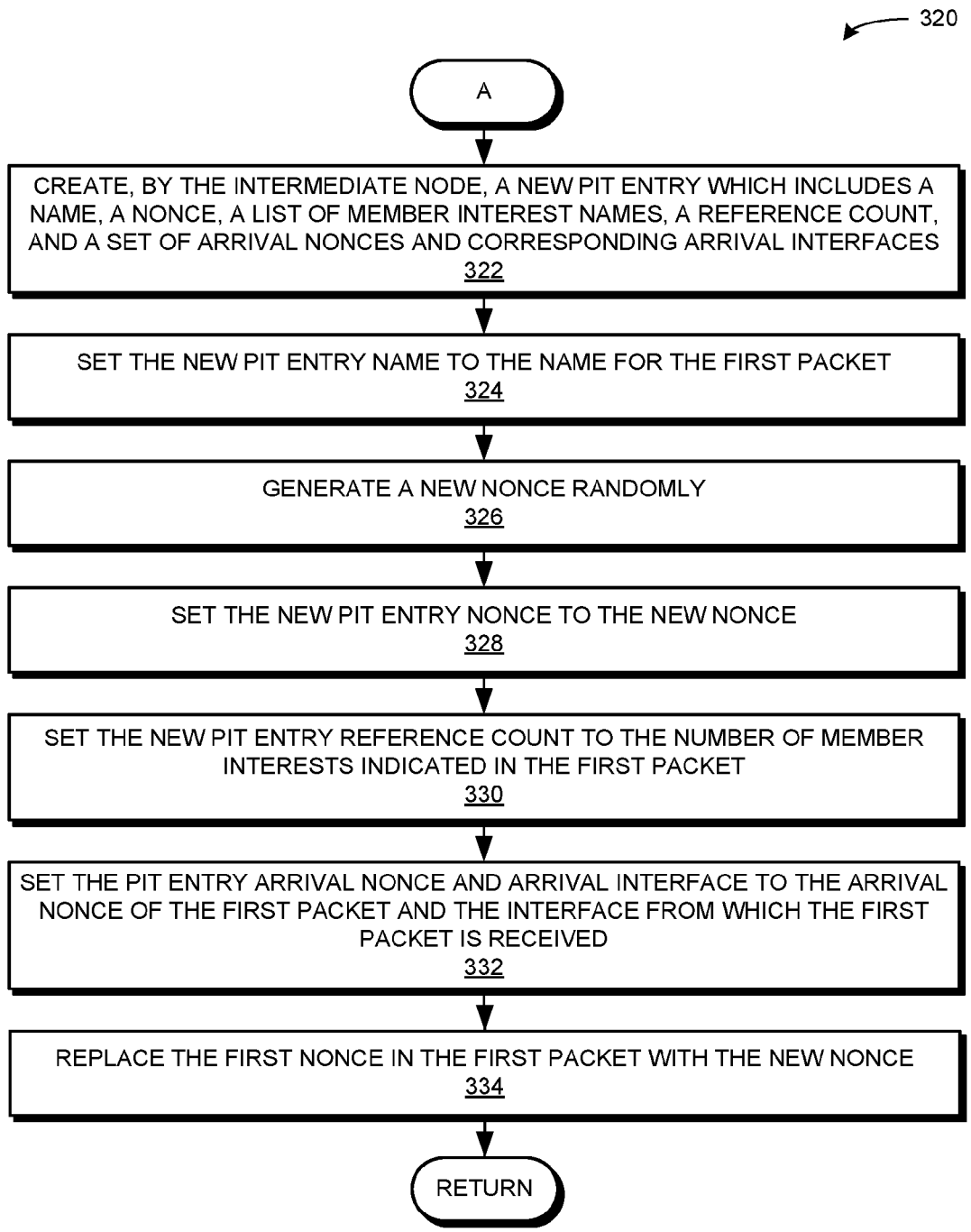
FIG. 3B presents a flow chart illustrating a method by an intermediate node for facilitating efficient communication of a collection of interests based on reference counted pending interest tables, in accordance with an embodiment of the present invention.

If a matching entry is not found in the PIT (decision 310), the operation continues as described at Label A of FIG. 3B. If a matching entry is found in the PIT (decision 310), the system adds the first nonce and the arrival interface to the matching PIT entry (operation 312). An exemplary PIT entry is described above in relation to FIG. 1C. The system replaces the first nonce of the first packet with the nonce indicated in the matching PIT entry (operation 314), and forwards the first packet based on information in the FIB (operation 316).

FIG. 3B presents a flow chart 320 illustrating a method by an intermediate node for facilitating efficient communication of a collection of interests based on reference counted pending interest tables, in accordance with an embodiment of the present invention. During operation, from Label A, the system creates, by the intermediate node, a new PIT entry which includes a name, a nonce, a list of member interest names, a reference count, and a list of corresponding arrival nonces and arrival interfaces (operation 322). The system sets the new PIT entry name to the name for the first packet (operation 324). The system generates a new nonce randomly (operation 326). The system sets the new PIT entry nonce to the new nonce (operation 328). The system sets the new PIT entry reference count to the number of member interests indicated in the first packet (operation 330). The system also sets the new PIT entry arrival nonce and arrival interface to the arrival nonce of the first packet and the interface from which the first packet is received (operation 332). The system replaces the first nonce in the first packet with the new nonce (operation 334).

Figure 3C:
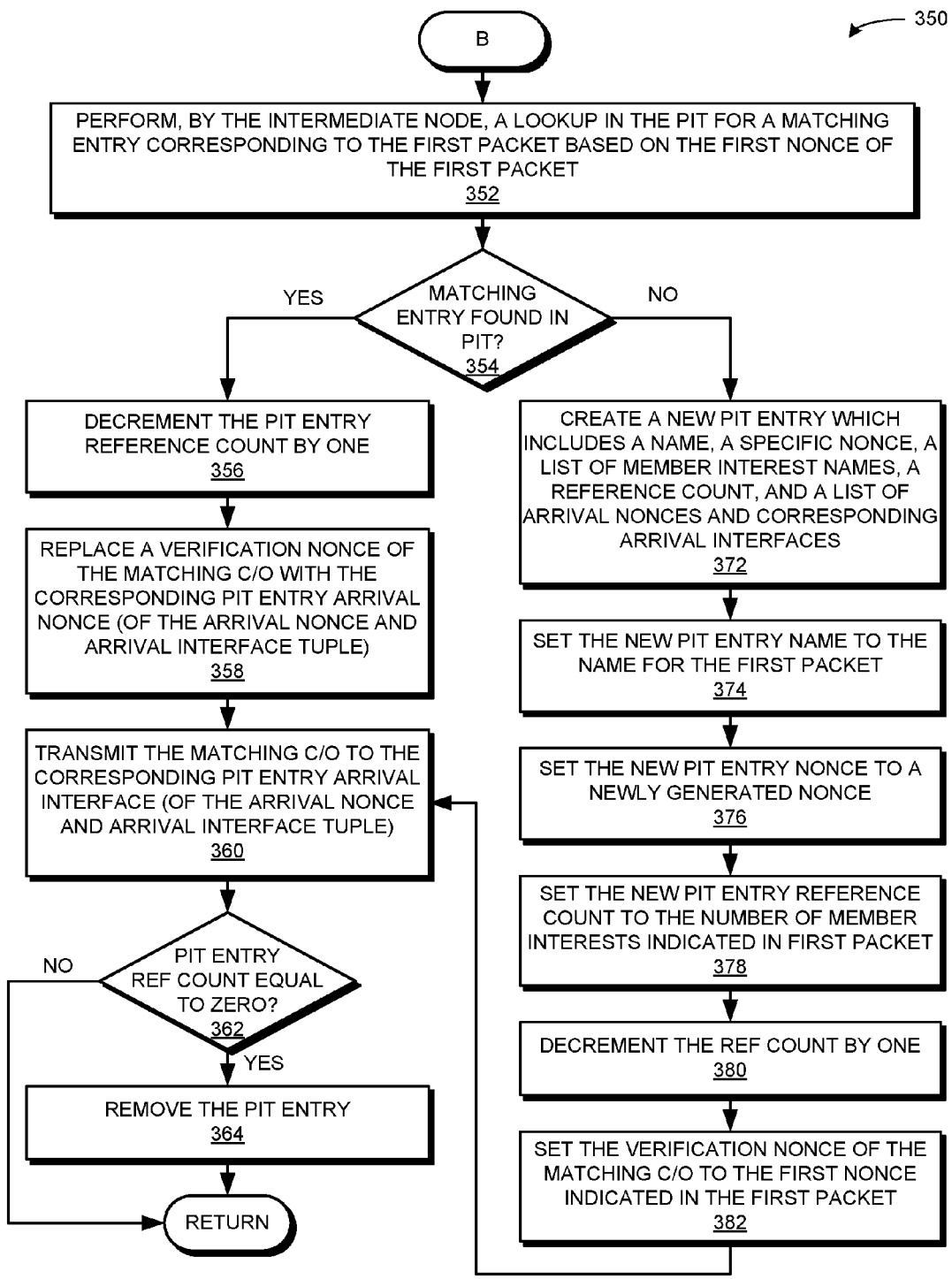
FIG. 3C presents a flow chart illustrating a method by an intermediate node for facilitating efficient communication of a collection of interests based on reference counted pending interest tables, in accordance with an embodiment of the present invention.

FIG. 3C presents a flow chart 350 illustrating a method by an intermediate node for facilitating efficient communication of a collection of interests based on reference counted pending interest tables, in accordance with an embodiment of the present invention. During operation, from Label B, the system performs a lookup in the PIT for a matching entry corresponding to the first packet based on the first nonce of the first packet (operation 352). If a matching entry is found in the PIT, the system decrements the PIT entry reference count by one (operation 356). The system replaces a verification nonce of the matching content object with the arrival nonce of the matching PIT entry (operation 358). The system transmits the matching content object to the corresponding arrival interface of the matching PIT entry (operation 360). If the PIT entry reference count is equal to zero (decision 362), the system removes the PIT entry from the PIT (operation 364). If the PIT entry reference count is not equal to zero (decision 362), the operation returns.

If no matching entry is found in the PIT (decision 356), the system creates a new PIT entry which includes a name, a nonce, a list of member interest names, a reference count, and a set of arrival nonces and corresponding arrival interfaces (operation 372). The system sets the new PIT entry name to the name for the first packet (operation 374) and sets the new PIT entry nonce to a newly generated nonce (operation 376). The system sets the new PIT entry reference count to the number of member interests indicated in the first packet (operation 378). The system also sets the new PIT entry arrival nonce and corresponding arrival interface to the arrival nonce of the first packet and the interface from which the first packet is received (not shown). The system decrements the PIT entry reference count by one (operation 380), and sets the verification nonce of the matching content object to the first nonce indicated in the first packet (operation 382). The matching content object can be obtained from the CS, or received from an upstream node. The content object can include an existing verification nonce, which is replaced when the system sets the verification nonce in operation 382. The system then transmits the matching content object to the corresponding arrival interface of the corresponding PIT entry (operation 360). The operation continues as described for decision 362.

Intermediate Node Processes Content Object

Figure 4A:
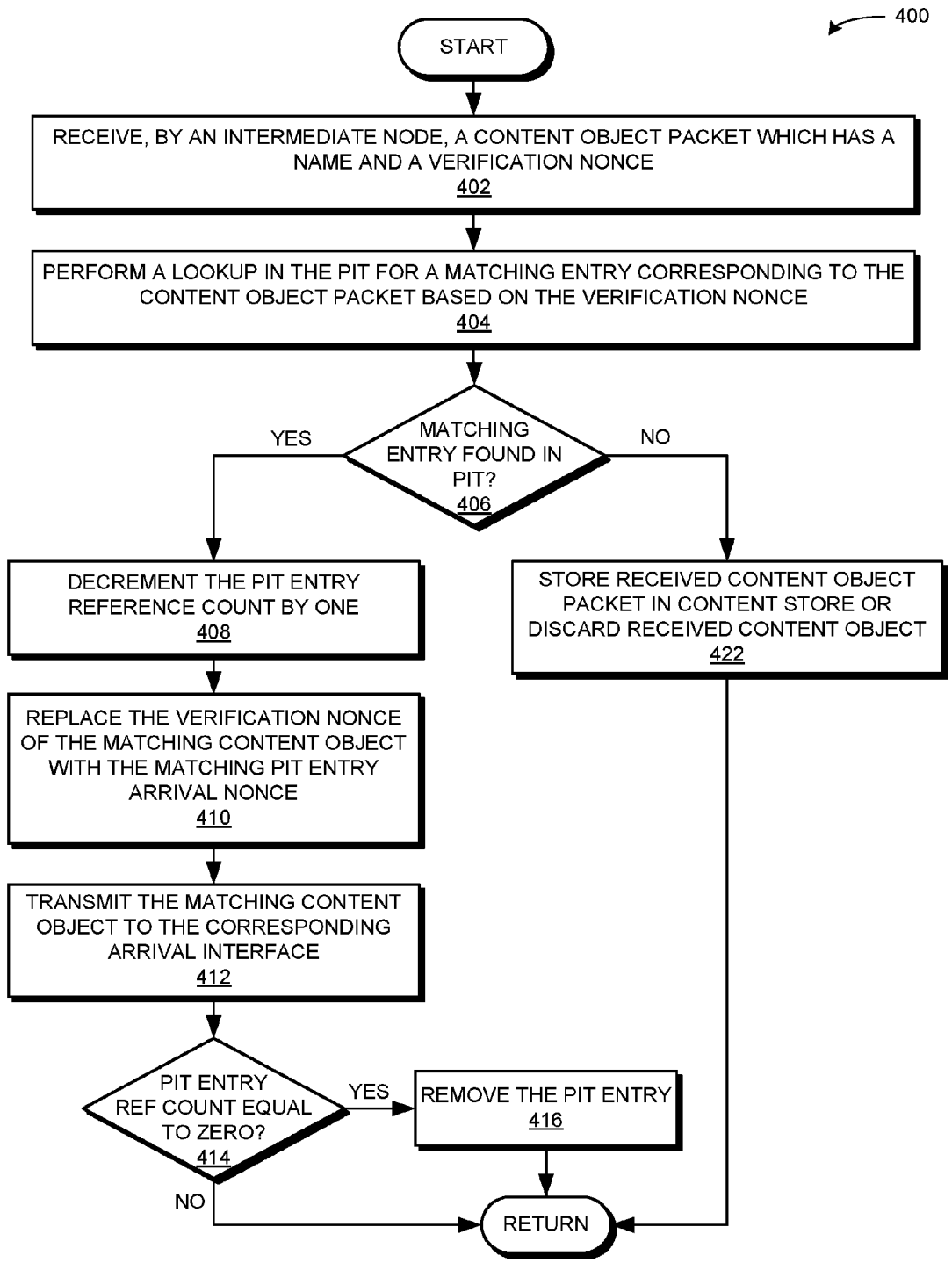
FIG. 4A presents a flow chart illustrating a method by an intermediate node for facilitating efficient communication of a collection of interests based on reference counted pending interest tables, including receipt of a content object which satisfies a member interest of an interest group, in accordance with an embodiment of the present invention.

FIG. 4A presents a flow chart 400 illustrating a method by an intermediate node for facilitating efficient communication of a collection of interests based on reference counted pending interest tables, including receipt of a content object which satisfies a member interest of an interest group, in accordance with an embodiment of the present invention. During operation, the system receives, by an intermediate node, a content object packet which has a name and a verification nonce (operation 402). The system performs a lookup in the PIT for a matching entry corresponding to the content object packet based on the verification nonce (operation 404). If a matching entry is found in the PIT (decision 406), the system decrements the PIT entry reference count by one (operation 408). The system replaces the verification nonce of the matching content object with the corresponding PIT entry arrival nonce (operation 410). The system transmits the matching content object (with the replaced verification nonce) to the corresponding arrival interface (operation 412). If the PIT entry reference count is equal to zero (decision 414), the system removes the PIT entry from the PIT (operation 416) and the operation returns. If the PIT entry reference count is not equal to zero (decision 414), the operation returns.

If no matching entry is found in the PIT (decision 406), the system stores the received content object packet in the CS or discards the received content object (operation 422).

Intermediate Node Processes Re-Transmitted Interest

Figure 4B:
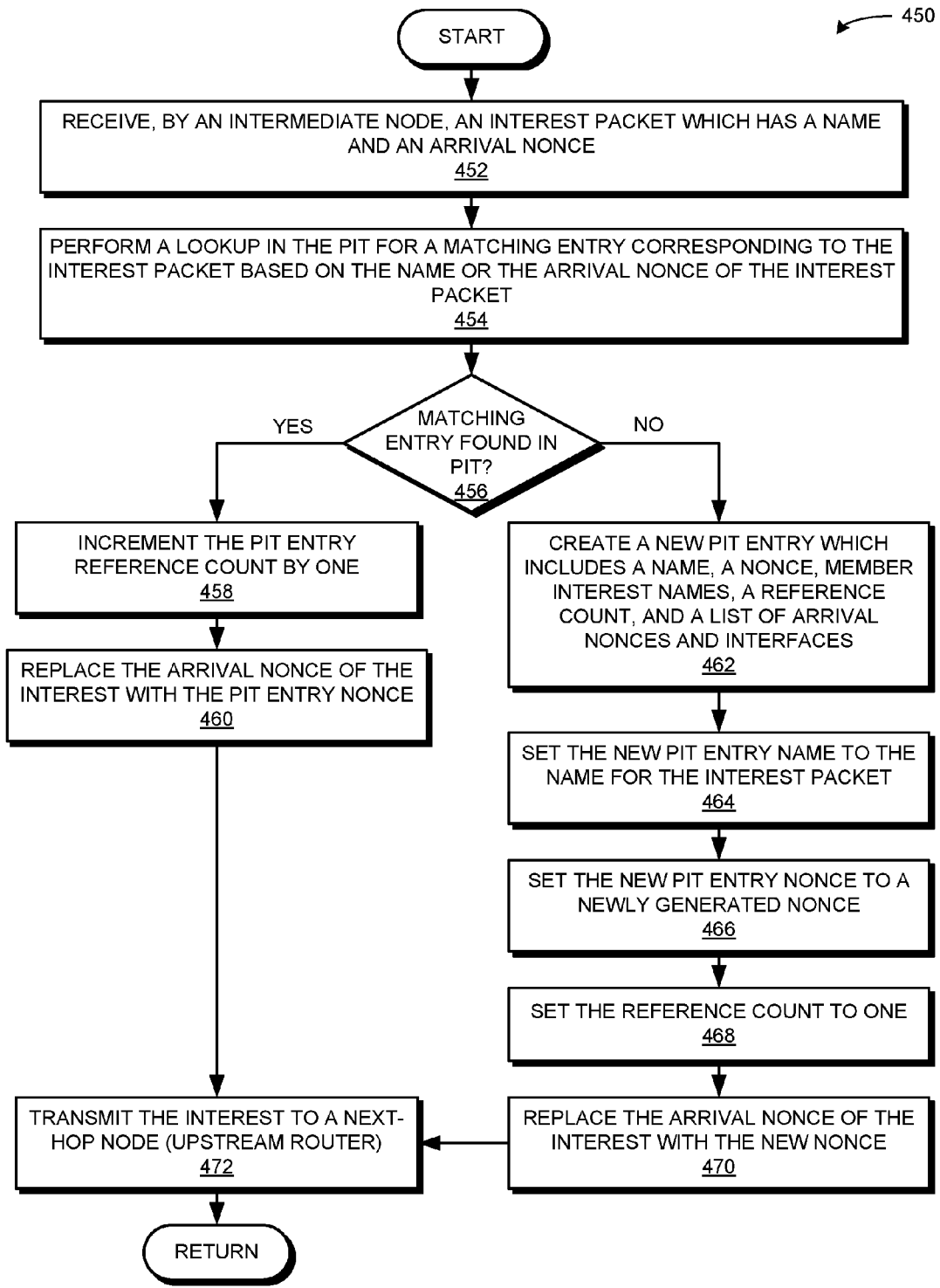
FIG. 4B presents a flow chart illustrating a method by an intermediate node for facilitating efficient communication of a collection of interests based on reference counted pending interest tables, including receipt of a re-transmitted interest which corresponds to a member interest of an interest group, in accordance with an embodiment of the present invention.

FIG. 4B presents a flow chart 450 illustrating a method by an intermediate node for facilitating efficient communication of a collection of interests based on reference counted pending interest tables, including receipt of a re-transmitted interest which corresponds to a member interest of an interest group, in accordance with an embodiment of the present invention. During operation, the system receives, by an intermediate node, an interest packet which has a name and an arrival nonce (operation 452). The system performs a lookup in the PIT for a matching entry corresponding to the interest packet based on the name or the arrival nonce of the interest packet (operation 454). If a matching entry is found in the PIT (decision 456), the system increments the matching PIT entry reference count by one (operation 458). The system replaces the arrival nonce of the interest with the matching PIT entry nonce (operation 460), and transmits the interest to a next-hop node (e.g., an upstream router) (operation 472).

If no matching entry is found in the PIT (decision 456), the system creates a new PIT entry which includes a name, a nonce, a list of member interest names, a reference count, and a set of arrival nonces and corresponding arrival interfaces (operation 462). The system sets the new PIT entry name to the name for the interest packet (operation 464) and sets the new PIT entry nonce to a newly generated nonce (operation 466). The system sets the new PIT entry reference count to the number of member interests indicated in the first packet (operation 468). In the case of a single re-transmitted interest, the system sets the new PIT entry reference count to a default value of "1." The system also sets the new PIT entry arrival nonce and corresponding arrival interface to the arrival nonce of the first packet and the interface from which the interest packet is received (not shown). The system replaces the arrival nonce of the interest packet with the new nonce (operation 470), and transmits the interest to a next-hop node (e.g., an upstream router) (operation 472).

Exemplary Computer and Communication System

Figure 5:
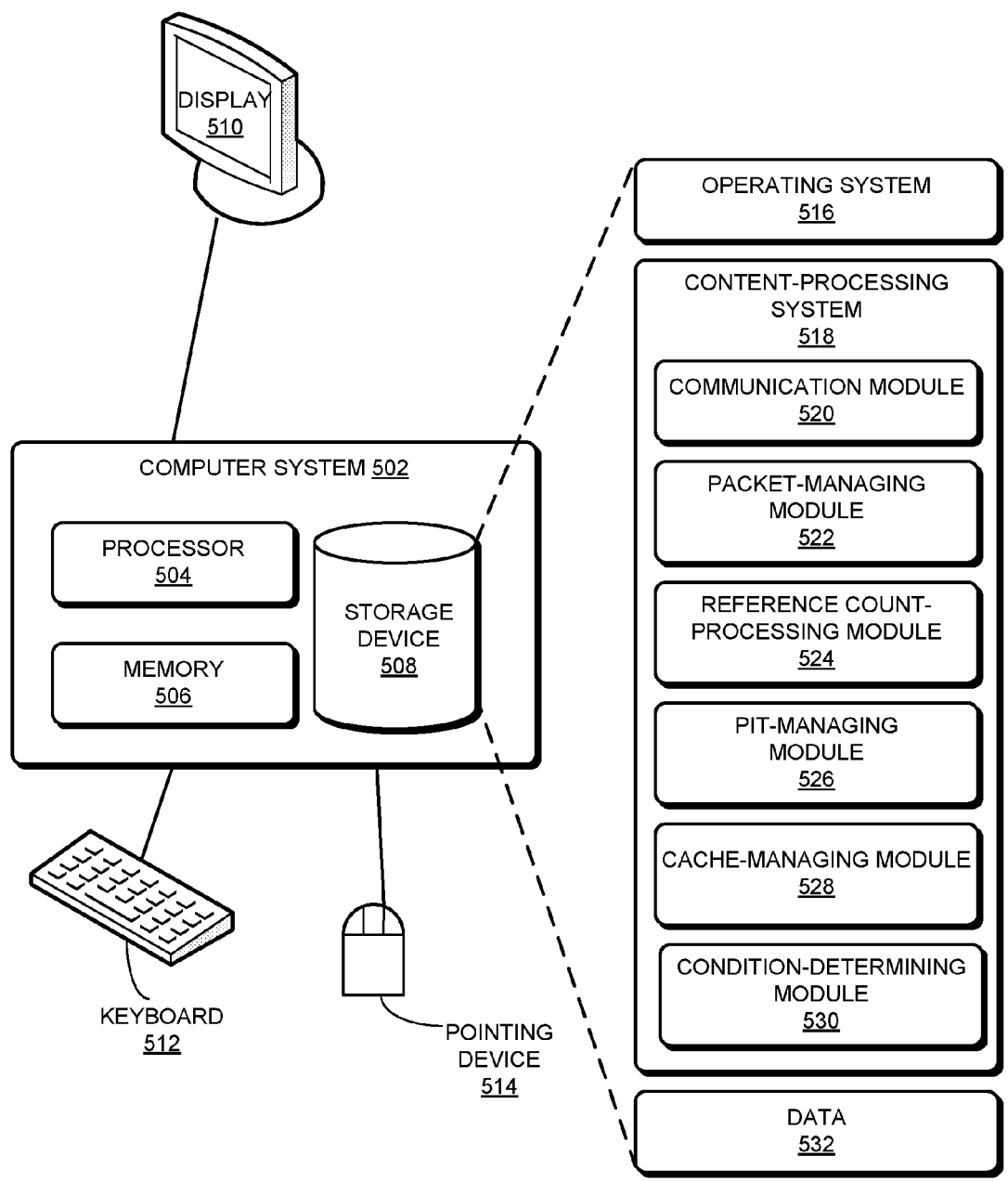
FIG. 5 illustrates an exemplary computer and communication system that facilitates efficient communication of a collection of interests based on reference counted pending interest tables, in accordance with an embodiment of the present invention.

FIG. 5 illustrates an exemplary computer and communication system that facilitates reference counted pending interest tables, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 532.

Content-processing system 518 can include instructions, which when executed by computer and communication system 502, can cause computer and communication system 502 to perform methods and/or processes described in this disclosure. Specifically, content-processing system 518 can include instructions for receiving, by an intermediate node, a first packet which has a name and a first nonce, wherein the first packet indicates a set of member interests, wherein a member interest has a name (communication module 520). Content-processing system 518 can also include instructions for, in response to not obtaining a matching entry in a PIT based on the name for the first packet, creating a new entry in the PIT, wherein an entry includes a second nonce, a reference count, and a set of arrival nonces and corresponding arrival interfaces (PIT-managing module 526). Content-processing system 518 can further include instructions for setting the new entry's second nonce to a new nonce and for setting the new entry's reference count to a number of member interests indicated in the first packet (PIT-managing module 526). Content-processing system 518 can include instructions for forwarding the first packet, wherein the first nonce is replaced with the new nonce (communication module 520).

Content-processing system 518 can additionally include instructions for, in response to determining that the reference count of an entry in the pending interest table is zero (reference count-processing module 524), removing the entry from the PIT (PIT-managing module 526). Content-processing system 518 can include instructions for setting the new entry's arrival nonce to the first nonce of the first packet and for setting the new entry's corresponding arrival interface to an interface corresponding to an entity from which the first packet is received (PIT-managing module 526).

Content-processing system 518 can also include instructions for, in response to obtaining a matching entry in the PIT (PIT-managing module 526): adding to the matching entry's set of arrival nonces and corresponding arrival interfaces the first nonce of the first packet and an arrival interface corresponding to an entity from which the first packet is received (PIT-managing module 526); replacing the first nonce of the first packet with the matching entry's second nonce (packet-managing module 522); and forwarding the first packet (communication module 520).

Moreover, content-processing system 518 can include instructions for, in response to obtaining a content object packet which has a name and a verification nonce (packet-managing module 522), and in response to obtaining a matching entry in the PIT based on the verification nonce (PIT-managing module 526): decrementing the matching entry's reference count by one (reference count-processing module 524); replacing the verification nonce of the content object packet with the matching entry's arrival nonce (packet-managing module 522); and transmitting the content object packet based on the matching entry's corresponding arrival interface (communication module 520).

Content-processing system 518 can further include instructions for receiving a second packet which has a name and an arrival nonce (communication module 520). Content-processing system 518 can include instructions for, in response to obtaining a matching entry in the PIT based on the name or the arrival nonce of the second packet (PIT-managing module 526), incrementing the matching entry's reference count by one (reference count-processing module 524).

Content-processing system 518 can also include instructions for, in response to obtaining a content object that satisfies a member interest (communication module 520), and in response to not obtaining a matching entry in the PIT (PIT-managing module 526): creating the new entry in the PIT (PIT-managing module 526); decrementing the new entry's reference count by one (reference count-processing module 524); setting a verification nonce of the obtained content object to the first nonce indicated in the first packet (packet-managing module 522); and transmitting the obtained content object based on the new entry's corresponding arrival interface (communication module 520).

Data 532 can include any data that is required as input or that is generated as output by the methods and/or processes described in this disclosure. Specifically, data 532 can store at least: a packet; a name; an interest group or interest group packet; an interest or interest packet; a content object or content object packet; a first nonce; a second nonce; an arrival nonce; a verification nonce; a set of member interests; a packet which has a name and indicates a set of member interests; a hierarchically structured variable length identifier that includes contiguous name components ordered from a most general level to a most specific level; a name for a packet; a name for an interest; a name for a content object; a name for an interest group; a pending interest table (PIT); an entry in a PIT; a reference count; a set of arrival nonces and corresponding arrival interfaces; a forwarding information base (FIB); a local cache or a content store (CS); an arrival interface associated with an interest; and a lookup in a PIT or CS.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, the method comprising:
   receiving, by an intermediate node, a first packet which has a name and a first nonce, wherein the first packet indicates a set of two or more member interests, wherein each member interest has a name, wherein a name is a hierarchically structured variable length identifier that includes contiguous name components ordered from a most general level to a most specific level;
   performing a search, by the intermediate node, for the name of the first packet in a pending interest table, the pending interest table including a plurality of entries;
   in response to not obtaining a matching entry in the plurality of entries of the pending interest table based on the name for the first packet, creating a new entry in the pending interest table, wherein the new entry includes a new nonce generated by the intermediate node, a reference count, and a set of arrival nonces and corresponding arrival interfaces;
   setting the new entry's reference count to a number of member interests indicated in the first packet;
   replacing the first nonce of the first packet with the new nonce;
   forwarding the first packet with the new nonce, by the intermediate node, thereby facilitating efficient communication of the set of member interests indicated in the first packet; and
   in response to obtaining a content object packet that has a matching entry in the pending interest table, transmitting the content object packet based on arrival interfaces of the matching entry.

2. The method of claim 1, further comprising:
   in response to determining that the reference count of an entry in the pending interest table is zero, removing the entry from the pending interest table.

3. The method of claim 1, further comprising:
   setting the new entry's arrival nonce to the first nonce of the first packet; and
   setting the new entry's corresponding arrival interface to an interface corresponding to an entity from which the first packet is received.

4. The method of claim 1, wherein in response to obtaining a matching entry in the pending interest table, the method further comprises:
   adding to the matching entry's set of arrival nonces and corresponding arrival interfaces the first nonce of the first packet and an arrival interface corresponding to an entity from which the first packet is received;
   replacing the first nonce of the first packet with a second nonce associated with the matching entry; and
   forwarding the first packet with the second nonce.

5. The method of claim 1, wherein the content object packet has a name and a verification nonce, and wherein obtaining the matching entry in the pending interest table is based on the verification nonce, the method further comprises:
   decrementing the matching entry's reference count by one; and
   replacing the verification nonce of the content object packet with the matching entry's arrival nonce.

6. The method of claim 1, further comprising:
   receiving a second packet which has a name and an arrival nonce;
   in response to obtaining a matching entry in the pending interest table based on the name or the arrival nonce of the second packet, incrementing the matching entry's reference count by one.

7. The method of claim 1, wherein in response to obtaining a content object that satisfies a member interest, and in response to not obtaining a matching entry in the pending interest table, the method further comprises:
   creating the new entry in the pending interest table;
   decrementing the new entry's reference count by one;
   setting a verification nonce of the obtained content object to the first nonce indicated in the first packet; and
   transmitting the obtained content object based on the new entry's corresponding arrival interface.

8. A computer system for facilitating forwarding of packets, the system comprising:
   a processor; and
   a storage device storing instructions that when executed by the processor cause the processor to perform a method, the method comprising:
      receiving, by an intermediate node, a first packet which has a name and a first nonce, wherein the first packet indicates a set of two or more member interests, wherein each member interest has a name, wherein a name is a hierarchically structured variable length identifier that includes contiguous name components ordered from a most general level to a most specific level;
      performing a search, by the intermediate node, for the name of the first packet in a pending interest table, the pending interest table including a plurality of entries;
      in response to not obtaining a matching entry in the plurality of entries of the pending interest table based on the name for the first packet, creating a new entry in the pending interest table, wherein the new entry includes a new nonce generated by the intermediate node, a reference count, and a set of arrival nonces and corresponding arrival interfaces;
      setting the new entry's reference count to a number of member interests indicated in the first packet;
      replacing the first nonce of the first packet with the new nonce;
      forwarding the first packet with the new nonce, by the intermediate node, thereby facilitating efficient communication of the set of member interests indicated in the first packet; and in response to obtaining a content object packet that has a matching entry in the pending interest table, transmitting the content object packet based on arrival interfaces of the matching entry.

9. The computer system of claim 8, wherein the method further comprises:
in response to determining that the reference count of an entry in the pending interest table is zero, removing the entry from the pending interest table.

10. The computer system of claim 8, wherein the method further comprises:
setting the new entry's arrival nonce to the first nonce of the first packet; and
setting the new entry's corresponding arrival interface to an interface corresponding to an entity from which the first packet is received.

11. The computer system of claim 8, wherein in response to obtaining a matching entry in the pending interest table, the method further comprises:
adding to the matching entry's set of arrival nonces and corresponding arrival interfaces the first nonce of the first packet and an arrival interface corresponding to an entity from which the first packet is received;
replacing the first nonce of the first packet with the matching entry's second nonce; and
forwarding the first packet.

12. The computer system of claim 8, wherein the content object packet a name and a verification nonce, and wherein obtaining the matching entry in the pending interest table is based on the verification nonce, the method further comprises:
decrementing the matching entry's reference count by one; and
replacing the verification nonce of the content object packet with the matching entry's arrival nonce.

13. The computer system of claim 8, wherein the method further comprises:
receiving a second packet which has a name and an arrival nonce;
in response to obtaining a matching entry in the pending interest table based on the name or the arrival nonce of the second packet, incrementing the matching entry's reference count by one.

14. The computer system of claim 8, wherein in response to obtaining a content object that satisfies a member interest, and in response to not obtaining a matching entry in the pending interest table, the method further comprises:
creating the new entry in the pending interest table;
decrementing the new entry's reference count by one;
setting a verification nonce of the obtained content object to the first nonce indicated in the first packet; and
transmitting the obtained content object based on the new entry's corresponding arrival interface.

15. A non-transitory computer-readable storage medium storing instructions that when executed by a computer cause the computer to perform a method, the method comprising:
receiving, by an intermediate node, a first packet which has a name and a first nonce, wherein the first packet indicates a set of two or more member interests, wherein each member interest has a name, wherein a name is a hierarchically structured variable length identifier that includes contiguous name components ordered from a most general level to a most specific level;
performing a search, by the intermediate node, for the name of the first packet in a pending interest table, the pending interest table including a plurality of entries;
in response to not obtaining a matching entry in the plurality of entries of the pending interest table based on the name for the first packet, creating a new entry in the pending interest table, wherein the new entry includes a new nonce generated by the intermediate node, a reference count, and a set of arrival nonces and corresponding arrival interfaces;
setting the new entry's reference count to a number of member interests indicated in the first packet;
replacing the first nonce of the first packet with the new nonce;
forwarding the first packet with the new nonce, by the intermediate node, thereby facilitating efficient communication of the set of member interests indicated in the first packet; and
in response to obtaining a content object packet that has a matching entry in the pending interest table, transmitting the content object packet based on arrival interfaces of the matching entry.

16. The storage medium of claim 15, wherein the method further comprises:
in response to determining that the reference count of an entry in the pending interest table is zero, removing the entry from the pending interest table.

17. The storage medium of claim 15, wherein in response to obtaining a matching entry in the pending interest table, the method further comprises:
adding to the matching entry's set of arrival nonces and corresponding arrival interfaces the first nonce of the first packet and an arrival interface corresponding to an entity from which the first packet is received;
replacing the first nonce of the first packet with the matching entry's second nonce; and
forwarding the first packet.

18. The storage medium of claim 15, wherein the content object packet has a name and a verification nonce, and wherein obtaining the matching entry in the pending interest table is based on the verification nonce, the method further comprises:
decrementing the matching entry's reference count by one; and
replacing the verification nonce of the content object packet with the matching entry's arrival nonce.

19. The storage medium of claim 15, wherein the method further comprises:
receiving a second packet which has a name and an arrival nonce;
in response to obtaining a matching entry in the pending interest table based on the name or the arrival nonce of the second packet, incrementing the matching entry's reference count by one.

20. The storage medium of claim 15, wherein in response to obtaining a content object that satisfies a member interest, and in response to not obtaining a matching entry in the pending interest table, the method further comprises:
creating the new entry in the pending interest table;
decrementing the new entry's reference count by one;
setting a verification nonce of the obtained content object to the first nonce indicated in the first packet; and
transmitting the obtained content object based on the new entry's corresponding arrival interface.

* * * * *

UNITED STATES PATENT AND TRADEMARK OFFICE
CERTIFICATE OF CORRECTION

PATENT NO. : 10,009,266 B2
APPLICATION NO. : 15/202071
DATED : June 26, 2018
INVENTOR(S) : Christopher A. Wood et al.

Page 1 of 1

It is certified that error appears in the above-identified patent and that said Letters Patent is hereby corrected as shown below:

In the Claims

Claim 12, Column 17, Line 29, please replace "object packet a name" with --object packet has a name--

Signed and Sealed this
Twenty-ninth Day of January, 2019

Andrei Iancu
*Director of the United States Patent and Trademark Office*